United States Patent [19]
Stehle et al.

[11] Patent Number: 5,632,845
[45] Date of Patent: May 27, 1997

[54] METHOD FOR WELDING TUBULAR PARTS

[75] Inventors: Richard Stehle, Radolfzell, Germany; Jörg Wermelinger, Schaffhausen, Switzerland

[73] Assignee: Georg Fischer Rohrleitungssysteme AG, Schaffhausen, Switzerland

[21] Appl. No.: 415,857

[22] Filed: Apr. 3, 1995

Related U.S. Application Data

[63] Continuation of Ser. No. 175,918, Dec. 30, 1993, which is a continuation of Ser. No. 951,476, Sep. 25, 1992, abandoned.

[30] Foreign Application Priority Data

Oct. 4, 1991 [CH] Switzerland ............ 02/935/91

[51] Int. Cl.$^6$ .............. B32B 31/04; B32B 31/12
[52] U.S. Cl. ............ 156/304.2; 156/64; 156/158; 156/258; 156/304.5; 156/304.6; 156/308.2; 156/309.9
[58] Field of Search ............... 156/304.1, 304.2, 156/304.5, 304.6, 258, 308.2, 309.9, 273.3, 358, 378, 64, 499, 158, 503; 269/37, 43

[56] References Cited

U.S. PATENT DOCUMENTS

| | | | |
|---|---|---|---|
| 3,901,497 | 8/1975 | Dearman | 269/37 |
| 4,263,084 | 4/1981 | Takala | 156/304.2 X |
| 4,352,708 | 10/1982 | McElroy | 156/304.2 X |
| 4,556,207 | 12/1985 | Thompson et al. | 156/499 X |
| 4,684,430 | 8/1987 | Handa et al. | 156/378 X |
| 4,929,293 | 5/1990 | Osgar | 156/304.2 X |
| 4,957,570 | 9/1990 | Jenkins et al. | 156/304.2 X |
| 5,013,376 | 5/1991 | McElroy, II et al. | 156/499 X |
| 5,104,102 | 4/1992 | Buxton | 269/43 |
| 5,206,980 | 5/1993 | Chapman | 269/43 X |
| 5,241,157 | 8/1993 | Wermelinger et al. | 156/304.2 X |
| 5,527,406 | 6/1996 | Brath | 156/64 |

*Primary Examiner*—David A. Simmons
*Assistant Examiner*—M. Curtis Mayes
*Attorney, Agent, or Firm*—Bachman & LaPointe, P.C.

[57] ABSTRACT

A method for welding tubular thermoplastic parts includes the steps of (a) providing first tubular and second tubular parts made of thermoplastic material and each having an end face; (b) determining a desired butt weld length for the parts; (c) providing a clamping member for coaxially clamping the parts, the clamping member including a first clamp for clamping the first part and a second clamp for clamping the second part, at least one of the first clamp and the second clamp being axially displaceable relative to the other between a part loading position and a butt weld position; (d) adjusting the butt weld position of the first and second clamps to a final butt weld position corresponding to the desired butt weld length; (e) clamping the parts in the clamps when the clamps are in the part loading position; (f) positioning a cutter between the end faces of the parts; (g) displacing the at least one of the first and second clamps toward the final butt weld position so that the cutter machines the end faces of the parts so as to provide machined end faces which are spaced to provide the desired butt weld length; (h) positioning a heater between the machined end faces of the parts so as to heat the machined end faces to a welding temperature; and (i) displacing the clamps toward the final butt weld position so that the machined end faces of the parts contact each other prior to the final butt weld position and are further pressed together to the final butt weld position.

10 Claims, 1 Drawing Sheet

METHOD FOR WELDING TUBULAR PARTS

This is a continuation of U.S. patent application Ser. No. 08/175,918 filed Dec. 30, 1993, which is a continuation of U.S. patent application Ser. No. 07/951,476 filed Sep. 25, 1992 now abandoned.

BACKGROUND OF THE INVENTION

The invention relates to an apparatus for welding tubular plastic parts that includes clamping devices for retaining the plastic tubular parts coaxially with each other and of which clamping devices at least one is axially displaceable with a hand lever, and a heating ray emitting heating device movable to a position between the ends of the tubular parts for contactless heating of the ends.

EP-A2-0167870 discloses a hand-held apparatus of the above-mentioned type that can be used for welding tubular parts having a small diameter. An error-free operation of this apparatus for obtaining substantially faultless welds is hardly possible because necessary control elements and an integrated machining of the tubular ends are absent.

German patent 2,212,055 discloses a welding apparatus in which heating of welding surfaces is effected by a contact with a heating element. The drawback of this method consists in a possible soiling of the heating surfaces of the heating element. In this apparatus, for moving the workpiece surfaces into engagement with the heating surfaces of the heating element, a reciprocal control of carriage displacement is necessary. To achieve quality welds, very expensive control elements for automatization of the welding process are required.

Accordingly, the object of the invention is an apparatus and method of the above-mentioned type that would permit obtaining of a substantially faultless welding connection despite use of a manual control and without utilization of expensive automatic control elements, and would also exclude continuation of a faulty operation.

SUMMARY OF THE INVENTION

The object of the invention is achieved by providing an apparatus and method for welding plastic parts that includes a welding control block comprising a memory for storing tub dimension and material dependent machining and welding parameters, and which is connected with a data input device and operation controlling elements.

According to the invention, the control block is also connected with a display device for displaying welding parameters and operating instructions in an order of executed operational steps.

Storing of machining and welding parameters and their display upon execution of the corresponding operational steps enables a problem-free manual operation. At that, operation Controlling elements make possible a set-actual value comparison that permits to exclude continuation of a faulty operation.

BRIEF DESCRIPTION OF THE DRAWINGS

The present invention both as to its construction so to its mode of operation will be best understood from the following detailed description of the preferred embodiment when read with reference to the accompanying drawings, wherein:
SINGLE FIGURE shows a schematic view of an apparatus for end face welding of tubular parts according to the present invention.

DETAILED DESCRIPTION OF THE PREFERRED EMBODIMENT

Figure 1:
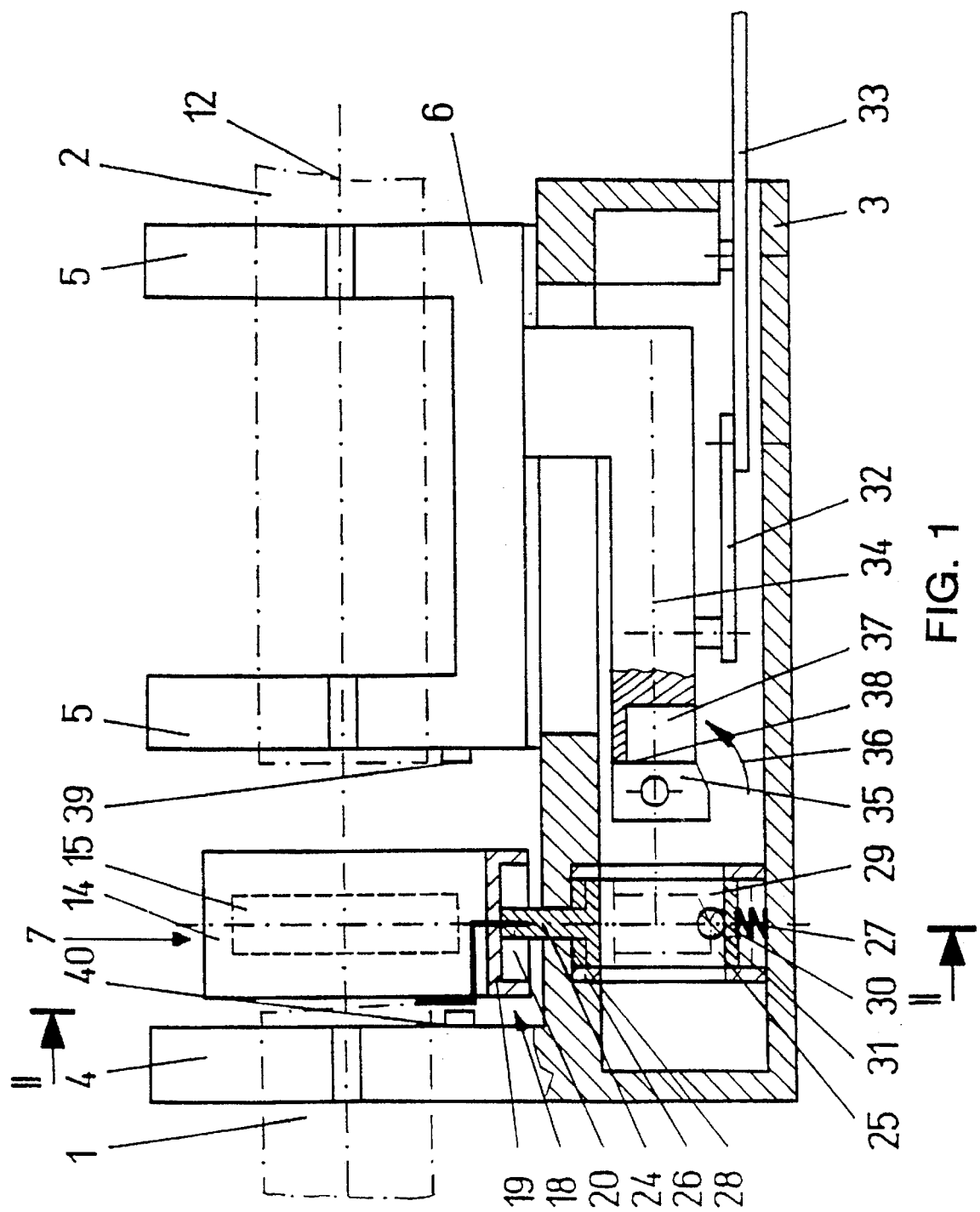

The drawing figure shows an apparatus for end face welding of tubular parts 1 and 2. The apparatus comprises a base stand 3, a first clamping device 4 fixedly mounted on the base stand 3, a second clamping device 5 which is axially displaceable along the base stand 3 on a carriage 6, and a heating device 7. The heating device 7 is mounted on a support 8 and is pivoted or linearly displaced into a position between the ends of tubular parts 1 and 2 which are fixedly retained in the clamping devices 4 and 5. The heating device 7 is displaced with a handle 9.

The heating device 7 is formed as an infra-red heating device for contactless heating of respective end faces of the tubular parts 1 and 2 with heat or infra-red rays. The heating device 7 is displaced on the support 8 along a guide 10 in a direction toward the fixedly mounted clamping device 4. The heating device 7 has a heating body 12 on which a plurality of electrically heatable heating inserts are arranged. At least one heat sensor is arranged on the heating body 12 and is operatively connected with a control block for proceeding control of the heating device 7. The heating body 12 is equipped with stop bosses 11 for engaging clamping devices 4 and 5. These stop bosses insure an appropriate distance between the ends of the tubular parts 1 and 2 and the outer surface of the heating body 12.

A cutting tool 14 is displaceably mounted on the guide 10 and can be manually pivoted or linearly displaced into a position between the clamping devices 4 and 5. The cutting tool 14 is power operated and has cutting elements on its opposite sides for machining the end faces of the tubular parts 1 and 2. The cutting tool 14 is also equipped with stop bosses 13 which, by engaging the clamping devices 4 and 5, limit the travel path of the cutting tool 14 and thereby define the amount of removable cut chips. The Cutting tool 14, during machining of the tubular parts end faces, is manually axially displaced by the displaceable clamping device 5 until the stop bosses 13 engage the clamping devices 4 and 5, so that, after machining, the end faces of the tubular parts 1 and 2 are spaced from respective end surfaces of the clamping devices 4 and 5 a predetermined distance.

A set screw 15 arranged in the base stand 3, together with a protrusion 16 on the carriage 6, forms an adjustable stop 17. A measuring element 18 is arranged parallel to the stop 17. The stop 17 sets the butt weld length, that is the length over which the two heated ends of the tubular members 1 and 2 are pressed together. The measuring element 18 measures or verifies this length.

A toggle adjustable drive 25 actuatable by a lever 25 effects displacement of the, carriage 6, together with the clamping device 5. The advantage of the toggle adjustable drive 26 consists in that it enables a rapid feed approach of the tubular parts 1 and 2 toward each other and, upon their pressure contact, at the end, a slow closing movement to the stop 17. In the stop position, the carriage 6 is self-retained by the dead point position of the toggle drive 26: The stop position is further insured by a spring 27 forming a part of the toggle drive 26 and by appropriate constructional tolerances.

As shown in the schematic view of the drawing figure, the apparatus includes a control block 20 with a memory 21. The control block 20 is connected with an input keyboard 22, an optical display 23, an audible signal device 24, the heating device 7, the measuring element 18, and different position switches 19, which, e.g., are arranged on the heating device 7 and the cutting tool 14. The memory 21 contains programmed, dependent on tube outer diameters, wall thickness, and material, cutting and welding parameters as well as course of welding and instructions necessary for manual operation. The control block 20 is connected with a connection element 28 of a printer 29 arranged on the base stand 3. The printer 29 prints a welding record after a welding operation is finished. In the memory 21, dependent on given different tube diameters, wall thicknesses and materials, the following data are programmed: butt weld length, welding temperature, heating time, transit time, and cooling time, with these data being displayable on the display 23.

The welding process proceeds in the following sequence:

a). Manual entry of the tube dimensions (the outer diameter and the wall thickness) and the material of the tubular parts to be welded.

b). Display of the welding parameters (temperature, heating time, transit time, cooling time).

c). Display of the set butt weld length.

d). Verification of the set butt weld length by approaching the two clamping devices to the stop 17, measuring and display of the actual value.

e). Setting the set value by rotation of the set screw 15.

f). Securing of the weldable parts 1 and 2 in the clamping devices 4 and 5, with the end surfaces of the clamping devices 4 and 5 engaging appropriate stops (not shown).

g). Pivoting the cutting tool 14 into its operating position, actuating it with a hand lever 25, and machining the respective end faces of the both tubular parts until no more material is chipped away (the stop bosses 13 engage the clamping devices).

h). Verification of the amount of the chipped away material by moving the ends of the tubular parts toward each other. If the display does not show 0.00–0.05, the cutting process should be repeated.

i). When the necessary welding temperature on the heating body is achieved, the display indicates the beginning of the welding operation.

k). The heating body moves on, and the heating time is set upon actuation of a respective one of the position switches 19. With the hand lever 25, the clamping device 5 is displaced toward the stop boss 11 for establishing a heating distance.

l). Upon expiration of the heating time (the display shows "0") and return movement of the clamping device 5, the heating device is also returned, and the tubular parts are moved toward each other by the handle 25 until the toggle drive is in its dead point position. Cooling time starts. All these steps should take place within the displayed transit time (e.g. 3 sec).

m). Upon expiration of the cooling time shown on the display, the printer prints welding record, and welded parts can be removed.

The actual data are compared with the set data in the control block, and if an unacceptable difference appears, an error record is made out.

An audible signal accompanies an optical display of different operational steps.

While a particular embodiment of the invention has been shown and described, various modifications thereof will be apparent to those skilled in the art and, therefore, is not intended that the invention be limited to the disclosed embodiment or to the details thereof, and the departure may be made therefrom within the spirit and scope of the invention as defined in the appended claims.

What is claimed is:

1. A method for welding tubular parts made of thermoplastic material, comprising the steps of:

(a) providing a first tubular part and a second tubular part made of thermoplastic material and each having an end face;

(b) determining a desired butt weld length for said first and second tubular parts;

(c) providing clamping means for coaxially clamping said first tubular part and said second tubular part, said clamping means comprising a first clamping device for clamping said first tubular part and a second clamping device for clamping said second tubular part, at least one of said first clamping device and said second clamping device being axially displaceable relative to the other between a tubular part loading position and a butt weld position;

(d) adjusting said butt weld position of said first and second clamping devices to a final butt weld position corresponding to said desired butt weld length;

(e) clamping said first and second tubular parts in said first and second clamping devices when said first and second clamping devices are in said tubular part loading position;

(f) positioning a cutting means between said end faces of said first and second tubular parts;

(g) displacing said at least one of said first and second clamping devices toward said final butt weld position so that said cutting means machines said end faces of said first and second tubular parts so as to provide machined end faces which are spaced to provide said desired butt weld length;

(h) positioning a heating means between said machined end faces of said first and second tubular parts so as to heat said machined end faces to a welding temperature; and (i) displacing said at least one of said first and second clamping devices toward said final butt weld position so that said machined end faces of said first and second tubular parts contact each other prior to said final butt weld position and are further pressed together to said final butt weld position.

2. A method according to claim 1, wherein step (g) further comprises displacing said at least one of said first and second clamping devices toward said final butt weld position so that said cutting means machines said end faces of said first and second tubular parts so as to provide machined end faces which are spaced relative to said first and second clamping devices to provide said desired butt weld length when said clamping devices are displaced to said final butt weld position.

3. A method according to claim 1, wherein step (g) comprises displacing said at least one of said first and second clamping devices toward said final butt weld position so that said cutting means machines said end faces of said first and second tubular parts so as to provide machined end faces which are spaced from respective ends of said first and second clamping devices by a predetermined distance so as to provide said desired butt weld length.

4. A method according to claim 1, wherein step (i) comprises the steps of rapidly feeding said first tubular part and said second tubular part toward each other until said machined end faces contact each other, and then further slowly feeding said first tubular part and said second tubular part toward each other to said final butt weld position.

5. A method according to claim 1, further comprising the step of displacing said at least one of said first and second clamping devices toward said final butt weld position, after step (g), until said machined end faces contact each other, and measuring a distance remaining to said final butt weld position to ensure that said distance remaining is within a predetermined tolerance of said desired butt weld length.

6. A method according to claim 1, further comprising the step of providing said cutting means with stop means for stopping said first and second clamping devices at a position relative to said cutting means wherein said machined end faces are spaced to provide said desired butt weld length, and wherein step (g) comprises the step of displacing said at least one of said first and second clamping devices toward said final butt weld position until said first and second clamping devices contact said stop means, whereby said cutting means machines said end faces to provide said desired butt weld length.

7. A method according to claim 1, further comprising the step of providing said clamping means with adjustable stop means for stopping said first and second clamping devices at said butt weld position, and wherein step (d) comprises the step of adjusting said adjustable stop means to a position for stopping said first and second clamping devices at said final butt weld position.

8. A method according to claim 1, further comprising the steps of providing said heating means with stop means for stopping said first and second clamping devices at a position corresponding to a desired heating distance, and wherein step (h) comprises the steps of displacing said at least one of said first and second clamping devices toward said final butt weld position until said first and second clamping devices contact said stop means whereby said machined end faces are positioned at said desired heating distance, holding said machined end faces at said desired heating distance for a predetermined heating time, and removing said heating means from between said machined end faces prior to step (i).

9. A method according to claim 1, further comprising the step of providing a control block having a memory containing tube outer diameter, wall thickness, and material for a plurality of tubular parts and corresponding butt weld length, welding temperature, heating time, transit time and cooling time for welding operations, and wherein step (b) comprises the step of entering tube outer diameter, wall thickness and material of said first and second tubular parts into said control block to obtain said desired butt weld length and a desired welding temperature, heating time, transit time and cooling time.

10. A method according to claim 9, further comprising the step of connecting said control block with said clamping means, cutting means and heating means so as to monitor said desired butt weld length, welding temperature, heating time, transit time and cooling time.

* * * * *